017101# United States Patent [19]

Schnöring et al.

[11] 3,976,609

[45] Aug. 24, 1976

[54] PROCESS FOR THE PREPARATION OF DISTRIBUTIONS

[75] Inventors: Hildegard Schnöring, Wuppertal-Elberfeld; Gottfried Pampus; Nikolaus Schon, both of Leverkusen; Josef Witte, Cologne-Stammheim, all of Germany

[73] Assignee: Bayer Aktiengesellschaft, Leverkusen, Germany

[22] Filed: Mar. 27, 1972

[21] Appl. No.: 238,522

Related U.S. Application Data

[63] Continuation of Ser. No. 739,154, June 24, 1968, abandoned.

[30] Foreign Application Priority Data

July 13, 1967 Germany................................ 52942

[52] U.S. Cl.................... 260/17 R; 260/29.6 ME; 260/29.6 MH; 260/29.6 PM; 260/29.7 AT; 260/29.7 PT

[51] Int. Cl.².......................................... C08L 47/00

[58] Field of Search . 260/17 R, 29.6 ME, 29.6 MH, 260/29.6 PM, 29.7 AT, 29.7 PT

[56] References Cited
UNITED STATES PATENTS

| | | | |
|---|---|---|---|
| 3,218,278 | 11/1965 | Leydon et al. | 260/29.6 MH |
| 3,219,601 | 11/1965 | Koontz | 260/16 |
| 3,228,906 | 1/1966 | Schluter et al. | 260/29.7 PT |
| 3,282,874 | 11/1966 | Friedrich et al. | 260/29.2 R |
| 3,424,705 | 1/1969 | La Heij | 260/29.7 PT |

*Primary Examiner*—Lucille M. Phynes
*Attorney, Agent, or Firm*—Connolly and Hutz

[57] ABSTRACT

A stable oil-in-water emulsion wherein the discontinuous phase comprises a water-immiscible organic liquid, said emulsion being stabilized by from 0.02 to 5% by weight, based on the weight of organic solvent present, of a laminator, said laminator being a linear high molecular weight polymer whose dilute aqueous solutions having a concentration of up to 0.05% by weight, lower the resistance index in turbulent flow by at least 10% without promoting any change in viscosity.

7 Claims, No Drawings

PROCESS FOR THE PREPARATION OF DISTRIBUTIONS

CROSS-REFERENCE TO RELATED APPLICATION

This application is a continuation of application Ser. No. 739,154 filed June 24, 1968, now abandoned.

This invention relates to a novel method of producing aqueous distributions and to distributions produced according to this process. For purposes of this invention a distribution is understood to comprise a stable distribution of a water-immiscible liquid (including solutions) in form of small droplets in water (emulsion) and a stable distribution of a solid substance in water (dispersion). If an emulsion is made from a solution of a solid substance, e.g., an organic polymer in a solvent which solution is emulgated in water and if the solvent is subsequently removed, a stable distribution of small solid particles in water is obtained, i.e., a dispersion or latex. A latex of this kind is also produced by directly dispersing the solid, for example as a melt, in the water and if necessary cooling the formed emulsion.

In the following reference is preferably made to producing emulsions of solutions of organic polymers in organic solvents (and latices therefrom), which is preferred embodiment of the invention, but it has to be kept in mind that distributions of other water-immiscible materials (especially emulsions of liquids) may be made as well.

It is known that polymers insoluble in water can be finely distributed in water and that the resulting distribution can be kept stable. A distribution of a solid polymer is known as a dispersion or latex. In such a latex, extremely small polymer particles are kept in a state of suspension in water. A distribution in water of a solution of a polymer in a water-immiscible solvent is known as an emulsion. Polymer dispersions or latices are usually obtained by polymerisation of an emulsion of the monomer or monomers in water. Polymers which cannot be obtained in this way and which are produced for example in solvents immiscible with water, are in general initially converted into an emulsion and the water-immiscible solvent is subsequently removed from them.

Aqueous emulsions of polymer solutions in organic water-immiscible solvents are always prepared by intensively mixing the polymer solution and the water, as a result of which the polymer solution is divided up into extremely small droplets which remain suspended in the water. Alternatively, the water is broken up into extremely small droplets which remain suspended in the polymer solution. The dispersing phase is known as the continuous phase, whilst the dispersed phase is known as the non-continuous phase. Emulsions such as these can be prepared in a variety of apparatus all of which merely produce an intensive mixing effect, for example by agitation.

In general, the emulsions referred to above are not stable, i.e., the two phases are separated from one another after a relatively short time. In order to keep an emulsion stable, an emulsifier has to be added to it. Emulsifiers are substances whose molecules carry both hydrophilic and hydrophobic radicals. The emulsifiers cover the surface of the non-continuous phase and thus prevent the very small droplets from combining and simultaneously reducing their surface area.

A large number of compounds, differing widely from one another, have been used as emulsifiers showing the aforementioned properties. There are non-ionic, anionic and cationic emulsifiers, all of which have only one property in common, namely that they contain in the molecule one part that is soluble in water and another part that is soluble in organic solvents. They also have one disadvantage in common, namely that they have to be added in relatively large quantities (approximately 1 to 10% by weight, based on the polymer solution). The polymer solutions used to prepare the emulsion normally contain from 5 to 20 parts by weight of solvent to 1 part by weight of polymer. Hence it follows that the ultimately solvent-free polymer dispersion contains from 5 to 50% weight of emulsifier. Generally speaking, an emulsifier content as high as this deprives polymer dispersions of this kind of any industrial value that they may otherwise have.

In addition, the concentration of the emulsion is also restricted by the limited effectiveness of the emulsifiers. If it is desired to prepare a latex from such an emulsion by removing the organic solvent (by heating), foaming initially occurs to an appreciable extent (and has to be eliminated by means of further additives), a latex of low solids content being obtained. If it is to be of any industrial value, this latex has to be creamed up, i.e., some of the continuous phase has to be removed. Creaming is often accompanied by destruction of some of the emulsion, so that this method involves not only expense, but also substantial losses of polymeric material.

The present invention relates to a novel and very broadly applicable method of distributing medium to high molecular weight organic materials which are immiscible with water or solutions of these organic materials in water-immiscible solvents in water, which method comprises distributing the organic material or its solution in water in the presence of from 0.02 to 2% by weight of a laminator. Preferred amounts of laminators are 0.05 to 1.0% by weight, the percentage being based on the water used.

The invention further relates to distributions (dispersions, emulsions, latices) produced according to the invention.

The invention is based upon the recognition that certain substances, hereinafter referred to as laminators, preserve the stability in water of a distribution of organic materials, preferably of a polymer solution in a solvent, immiscible with water, although they do not act as emulsifiers in the sense defined above.

Laminators are linear high polymers of extremely high molecular weight, (e.g., $10^6 - 10^8$) that is to say with very long chains of molecules, which are soluble in water in small quantities. They may be defined as linear high polymers that reduce dissipation energy in turbulent flow, i.e., substances whose dilute aqueous solutions (having a concentration up to 0.05% by weight) lower the resistance index in turbulent flow by at least 10% independently of a change in viscosity (the resistance index and its measurement is described in VDI research booklets nos. 356 and 361 by I. Nikurados. The measurements on which the following data is based were made on tubes 10 mm in internal diameter).

Laminators are substances of widely varying chemical nature found among substances of the kind whose dilute aqueous solutions (concentration up to 0.05% by weight) increase the intrinsic viscosity of the pure water and whose dilute solutions show non-Newtonian properties. Although the increase in viscosity is a necessary requirement, it is not in itself sufficient; for example, although dilute gelatin solutions satisfy the requirement concerning the increase in viscosity, because gelatin is a substance of high molecular weight, they do not act as laminators in the sense defined above because they do not lower the resistance index or number.

One type of laminators are molecules of high molecular weight which constitute polyvalent ions (ionic molecules in the following text) whose 0.005 to 0.5% by weight aqueous solutions show the following properties: In these solutions, the energy of dissipation with turbulent flow is reduced in comparison with pure water, i.e., the resistance index is reduced by at least 10% in an at most 0.05% by weight solution. The ion molecules are then present in the solution at least partly in the form of stretched chains. This is seen from the fact that the equivalent conductivity of the solutions increases with decreasing concentration. In other words, the contribution of one molecule to the electrical conductivity is the greater, the lower the concentration. This property may also be governed by the pH-value of the solution. It is quite possible, for example, for ionic molecules, such as these, to be present in linear form, at alkaline pH-values, although following the addition of acids or anions they combine with one another to form agglomerates or associates. As a result, they are usually deprived of their laminator property. The same can also happen when salts are added.

Stated differently, to cause a reduction in dissipation energy it is necessary that the ionic molecules be at least partly in the form of stretched chains. If a long-chain linear molecule is dissolved in a solvent and left to itself, it will always curl up irregularly so that it constitutes a spherical ball. Provided this chain molecule is an ionic molecule, meaning that it contains electrical charge of equal sign located on it or on short side chains which are fixed on specific atoms and cannot be displaced, the repulsion of these electric charges will stretch out the chain.

For example, polyethylene oxide loses its laminator property by the addition of limited quantities of salts, i.e. by the addition of ions as ions of any type convert the filamentary molecule (meaning the molecule in a stretched form) into an agglomerate molecule (meaning the molecule in a coiled form). Polyvalent polyfunctional macromolecules with polar groups along the molecular chains, or in short side chains (for example polyacrylic acid or carboxymethyl cellulose) are largely unaffected by adding ions (addition of salts). These substances are particularly preferred as laminators because their reduction of turbulence is affected to a very limited extent only by added ions.

Polyvalent polyfunctional macromolecules with polar groups are molecules which contain in their molecular chain or on short side chains or groups (for instance —O—, —NH—) which differ in their electronegativity from the groups or atoms they are bonded to (e.g., —CH$_2$—). The bond formed in these cases is a polar bond which leaves a residual electric charge on each group. This partial charge is sufficient to inhibit curling up of the molecule if enough polar groups are present along the chain or on the short side chains. This type of charge cannot be affected by adding ions. Added ions certainly are unable to neutralize this type of charge in contrast to true ionic charges as outlined above.

Laminators may alternatively be defined as linear chain molecules of at least limited solubility in water whose length is approximately from 0.01 to 1.0 $\mu$, being considerably greater than their diameter. Since the average diameter of the droplets of polymer solution in the aqueous emulsion is approximately from 0.1 to 1.0 $\mu$, it will be appreciated that the length of a laminator molecule is itself similar to the size of the these droplets of solution. The effect of the laminators is based on a purely physical phenomenon. The water solubility has to be at least sufficient for producing a solution of 0.05% by weight of the laminator in water.

One preferred embodiment of this invention relates to producing stable emulsions of a solution of a polymer in an organic water-immiscible solvent in water by mixing water and the organic solution in the presence of a laminator (as defined above) in the specified amounts.

To prepare the distributions, these organic materials including polymer solutions may be used in quantities of preferably from 20 to 80% by volume, based on the total mixture.

The distributions may be prepared for example in conventional mixers. The aqueous solution of the laminator is then preferably first introduced and the organic material, preferably the polymer solution is run into it, resulting immediately in the formation of a distribution in which the water forms the continuous phase. It is also possible to start with the organic material and then to run the laminator solution into it. In this case, a distribution may initially be formed in which the organic material, e.g., the polymer solution represents the continuous phase but which is converted by the continued addition of the laminator solution into the required distribution with water as the continuous phase. It is also possible, however, to arrange both starting materials in layers in a vessel equipped with stirring mechanism, in which case the required aqueous distribution is obtained after various intermediate stages have been passed. Yet another alternative is to prepare from water and organic substance, e.g., polymer solution, an emulsion in which the organic liquid, e.g., the polymer solution, forms the continuous phase, and to reverse the direction of emulsification, either by the addition of the undissolved laminator or by the addition in small quantities of a highly concentrated laminator solution, so that water becomes the continuous phase of the distribution.

Finally, the laminator may be mixed with the organic material, e.g., the polymer solution, so that, for example, a suspension of the laminator in the organic material, e.g., the polymer solution, is obtained, and the resulting system is subsequently stirred with water. A distribution with water as the continuous phase is formed in this case, too.

The distributions thus prepared using mixers, generally have an average diameter of the drops of organic material, e.g., polymer solution which can be adjusted by the design of the mixer, the fittings inside it and the rotational speed of the stirrer, although it is generally not less than 1 $\mu$ and not more than 10 $\mu$. If drops of smaller diameter are required, the distribution is fed to a conventional type of homogeniser in which drops with dimensions to a colloidal level are formed by means of hydrodynamic sheer stress zones and/or by cavitation.

The various methods of distributing the water-immiscible material in water are conventional. Generally speaking, the organic material should be in liquid form at the time the distributing is carried out, i.e., it may constitute a liquid, a melt or a solution. If the organic material is a solid at room temperature, the mixing or stirring may either be carried out at a temperature where the material is molten or a solution in a water-immiscible solvent may be used. The temperature which is used in the distributing operation may be from about −20 to about +150°C and is governed only by the requirement that the aqueous phase must be in the liquid state. Temperatures below 0°C may be used by lowering the freezing point of water with appropriate additives and temperatures above 100°C by applying pressure. Normally temperatures of from 0° to 50°C will be used.

If the organic material is a liquid at room temperature, it may be distributed as such or after adding a solvent (to reduce viscosity).

If the organic material is a solution in a low boiling organic solvent, the solvent may be removed by evaporation from the emulsion formed which simultaneously transforms the emulsion into a dispersion.

One of the advantages of the distributions of this invention is that they can be boiled at normal pressure without any adverse effects.

Medium and high molecular weight organic materials in the context of this invention include:

a. High molecular weight water-insoluble polymers (e.g., of a molecular weight of above about 50,000) of a plastic or rubbery nature. Examples of these polymers are synthetic elastomers as homopolymers and copolymers of dienes, for example polybutadiene, polyisoprene, polychloroprene, styrene-butadiene rubber, isobutylene-diene copolymers, polyisobutylene, especially stereospecific polymers of these monomers. Further polymers and copolymers of monoolefins, for instance polystyrene, polyethylene, polypropylene, ethylene vinyl acetate copolymers, styrene-acrylonitrile copolymers, ethylene-propylene copolymers, acrylic polymers, for instance polyacrylic or polymethacrylic acid esters. These polymers may be distributed directly in the form of their melt (provided they can be melted) or as solutions in water-immiscible solvents. Suitable solvents of this type which are also applicable for the materials under (b) are for instance aliphatic and aromatic hydrocarbons such as hexane, cyclohexane, octane, gasoline fractions, benzene and toluene. The solutions of the polymers in these solvents are generally approximately 2 to 20% by weight solutions.

b. Substances of medium molecular weight (e.g., of a molecular weight of about 500 to 50,000) which include polymers of the monomers under (a) which have an oil-like or wax-like appearance, e.g., oil-type polybutadienes, mineral oils, for instance naphthenic, paraffinic and aromatic hydrocarbon oils, polyethylene waxes, other natural and synthetic waxes, prepolymers from polyesters or polyethers and isocyanates, polyepoxide preadducts, polysiloxanes and silicone oils.

These products are mostly liquids at room temperature or at slightly elevated temperatures and may be distributed as such. Distributing may be facilitated by slightly raising the temperature and/or by adding a suitable solvent as defined above.

Carboxymethyl cellulose, hydroxyethyl cellulose, sodium alginates and methylcellulose, are all examples of laminators that are suitable for the purposes of the invention. Polyacrylamide and salts of styrene/maleic acid copolymers are also suitable, but only if they satisfy the conditions stipulated in the foregoing, i.e., only if they are able to reduce the resistance number by at least 10% in an at most 0.05% by weight solution. Accordingly, the groups of substances mentioned above also contain substances which do not satisfy this requirement, for example substances whose molecular weights and hence chain lengths are inadequate.

Suitable and unsuitable representatives of the same classes of compounds are compared with one another in the following Table. The viscosity of the aqueous solution may be regarded as an approximate measure of the molecular weight. However, this viscosity reference is not in itself sufficient to distinguish the substances.

TABLE

| Substance | Viscosity of the aqueous solution at the concentration indicated | | Reduction in resistance index compared to pure water |
|---|---|---|---|
| | cP | % | % |
| 1. Carboxymethyl cellulose | 3000 | 1 | 45 |
| 2. Carboxymethyl cellulose | 35 | 2 | 4 |
| 3. Hydroxyethyl cellulose | 3800 | 1 | 40 |
| 4. Sodium alginate | 10000 | 2 | 38 |
| 5. Sodium alginate | 200 | 1 | 5 |
| 6. Methyl cellulose | 30000 | 2 | 35 |
| 7. Methyl cellulose | 28 | 2 | 0 |
| 8. Polyacrylamide | 1000 | 2 | 20 |
| 9. Sodium salt of styrene/maleic acid copolymer | 1000 | 1 | 29 |
| 10. Sodium salt of styrene/maleic acid copolymer | 40 | 2 | 0 |
| 11. Diethylamine salt of styrene/maleic acid copolymer | 1200 | 1 | 23 |
| 12. Diethylamine salt of styrene/maleic acid copolymer | 35 | 2 | 0 |

Accordingly, substances 1, 3, 4, 6, 8, 9 and 11 of this Table are laminators as defined in accordance with the invention. The remaining compounds are not.

The emulsions are prepared by methods known per se. Since the laminators are used in small quantities only (i.e., from 0.02 to 2% by weight), the resulting emulsions are practically free of foreign substances.

The emulsions prepared with laminators are preferably used inter alia for the production of latices with definite particle sizes because the solvent may readily be distilled off without appreciable foaming from the emulsions prepared in accordance with the invention.

These latices are free of soaps and wetting agents, unlike those prepared by conventional processes. They may either be processed as such or may be used with particular advantage for the production of graft polymers, because the particle size of the latex can be adjusted to a specific level by the homogenising process and is not directly governed with so much uncertainty by the manufacturing process, as has hitherto been the case. As a result, the properties of the graft polymers are variable within wide limits.

EXAMPLE 1

A 0.05% by weight aqueous solution of high molecular weight carboxymethylcellulose (viscosity in 1% by weight solution: 3000 cP, reduction in resistance index: 45%) is prepared. An equivalent quantity by volume of a 10% by weight polybutadiene solution in benzene is added to the resulting solution with vigorous stirring. A stable emulsion is formed with water as the continuous phase. The average diameter of the drops of polymer solution in the emulsion is $10\mu$.

EXAMPLE 2

A 0.1% by weight solution of the same carboxymethyl cellulose as used in Example 1 is mixed with a 10% by weight 1,4-cis-polyisoprene solution in hexame in a ratio by volume of 1:1, giving an emulsion in which water forms the continuous phase. The average droplet diameter of the polymer solution in the emulsion is $1\mu$. It is possible by homogenising this solution to adjust the average droplet size to values from 0.8 to $0.2\mu$.

EXAMPLE 3

A 0.08% by weight solution of hydroxyethyl cellulose (viscosity in 1% by weight aqueous solution: 3800 cP, reduction of viscosity index: 40%) is stirred with twice the volume of a 10% by weight 1,4-cis-polyisoprene solution in hexane to form an emulsion. An emulsion with water as the continuous phase is again formed. It is possible by homogenisation to adjust the average droplet diameter to values from 0.8 to $0.2\mu$.

EXAMPLE 4

A 0.1% by weight aqueous solution of the diethylamine salt of a styrene/maleic acid copolymer (viscosity in 1% by weight aqueous solution; 1200 cP, reduction of viscosity index: 23%) is stirred with 3½ times its volume of a 10% by weight butyl rubber solution in hexane to form an emulsion with water as the continuous phase. The average diameter of the droplets after homogenisation is $1\mu$.

EXAMPLE 5

A 0.05% by weight aqueous solution of a polyacrylamine (viscosity in 1% by weight solution: 1000 cP, reduction of the viscosity index: 20%), is stirred with 1.5 times its volume of a 10% by weight solution of a butadiene/styrene copolymer in benzene to form an emulsion with water as the continuous phase. After homogenization, the average diameter of the droplets is $2\mu$.

EXAMPLE 6

A 0.1% by weight aqueous solution of the sodium salt of a styrene/maleic acid copolymer (viscosity in 1% by weight aqueous solution: 1000 cP, reduction of the resistance index: 29%) is mixed with 1.8 tims its volume of a 12% by weight perchloropolyethylene solution in carbon tetrachloride to form an emulsion with water as the continuous phase. The average diameter of the droplets after homogenization is $1.3\mu$.

We claim:

1. A stable oil-in-water emulsion wherein the discontinuous phase is a solution of an organic compound having a molecular weight of at least 500 in a water-immiscible organic solvent thereof and constitutes 20 to 80% by volume of the total emulsion and wherein the agent responsible for emulsification consists of from 0.02 to 2% by weight, based on the weight of water in said emulsion, of a linear polymer, said linear polymer having a molecular weight of the order of $10^6 - 10^8$ and an aqueous solution thereof having a concentration of 0.05% by weight lowering the resistance index in turbulent flow by at least 10%.

2. The stable oil-in-water emulsion of claim 1 wherein said linear polymer is polyethylene oxide, polyacrylic acid or carboxymethyl cellulose.

3. The stable oil-in-water emulsion of claim 1 wherein the organic compound of said discontinuous phase is polybutadiene.

4. The stable oil-in-water emulsion of claim 1 wherein the organic compound of said discontinuous phase is 1,4-cis-polyisoprene.

5. The stable oil-in-water emulsion of claim 1 wherein the linear polymer is carboxymethyl cellulose.

6. The stable oil-in-water emulsion of claim 1 wherein the linear polymer is hydroxyethyl cellulose.

7. A stable oil-in-water emulsion wherein the discontinuous phase is a solution of polybutadiene or 1,4-cis-polyisoprene having a molecular weight of at least 500 in a water-immiscible organic solvent thereof and constitutes 20 to 80% by volume of the total emulsion and wherein the agent responsible for emulsification consists of from 0.02 to 2% by weight, based on the weight of water in said emulsion, of a linear polymer selected from the group consisting of carboxymethyl cellulose and hydroxyethyl cellulose, said linear polymer having a molecular weight of $10^6 - 10^8$ and an aqueous solution thereof having a concentration of 0.05% by weight lowering the resistance index in turbulent flow by at least 10%.

* * * * *